May 15, 1934.　　　　　J. P. LYNN　　　　　1,959,288
METHOD OF MAKING PENCIL BODIES
Filed July 11, 1931　　5 Sheets-Sheet 1
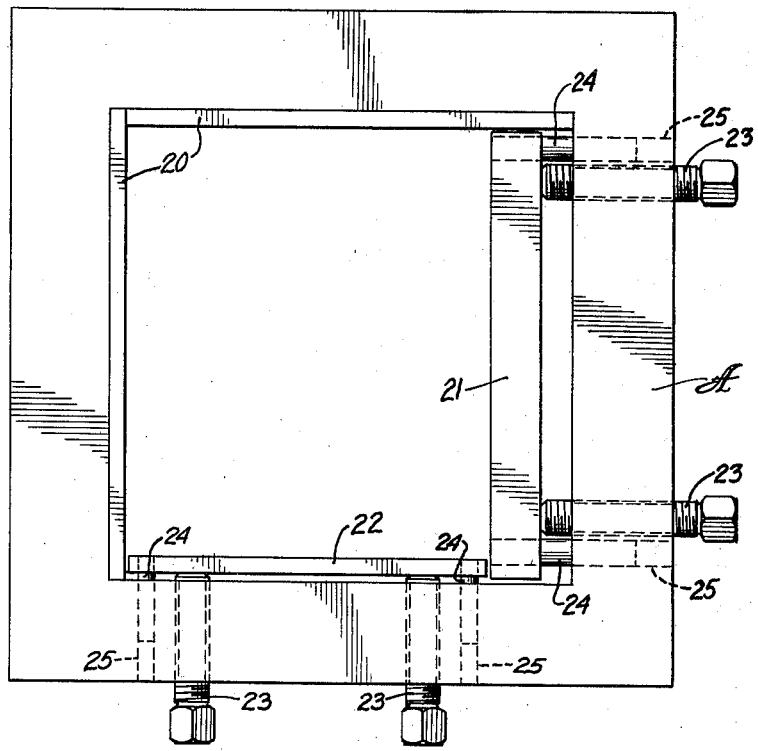
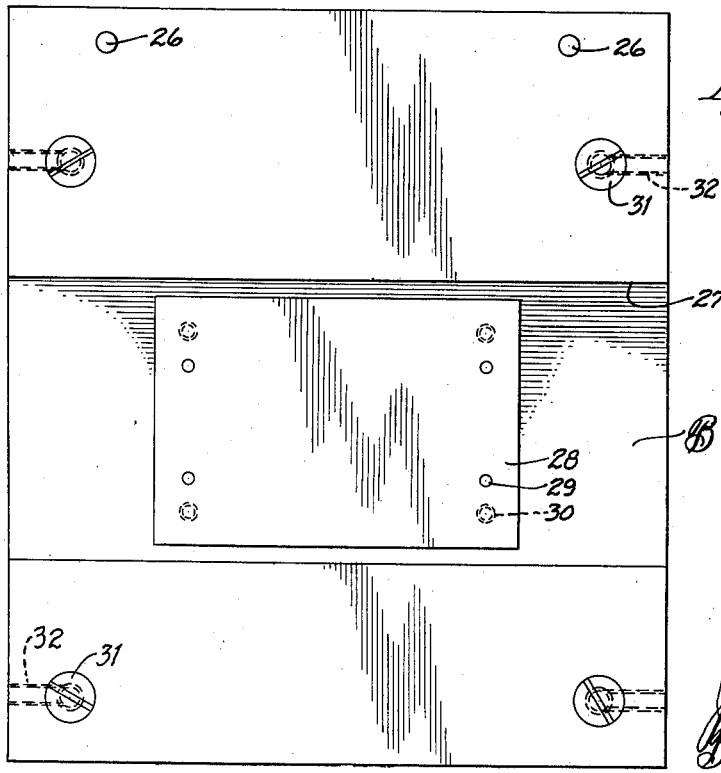
Inventor:
John P. Lynn,
By Banning & Banning
Attys.

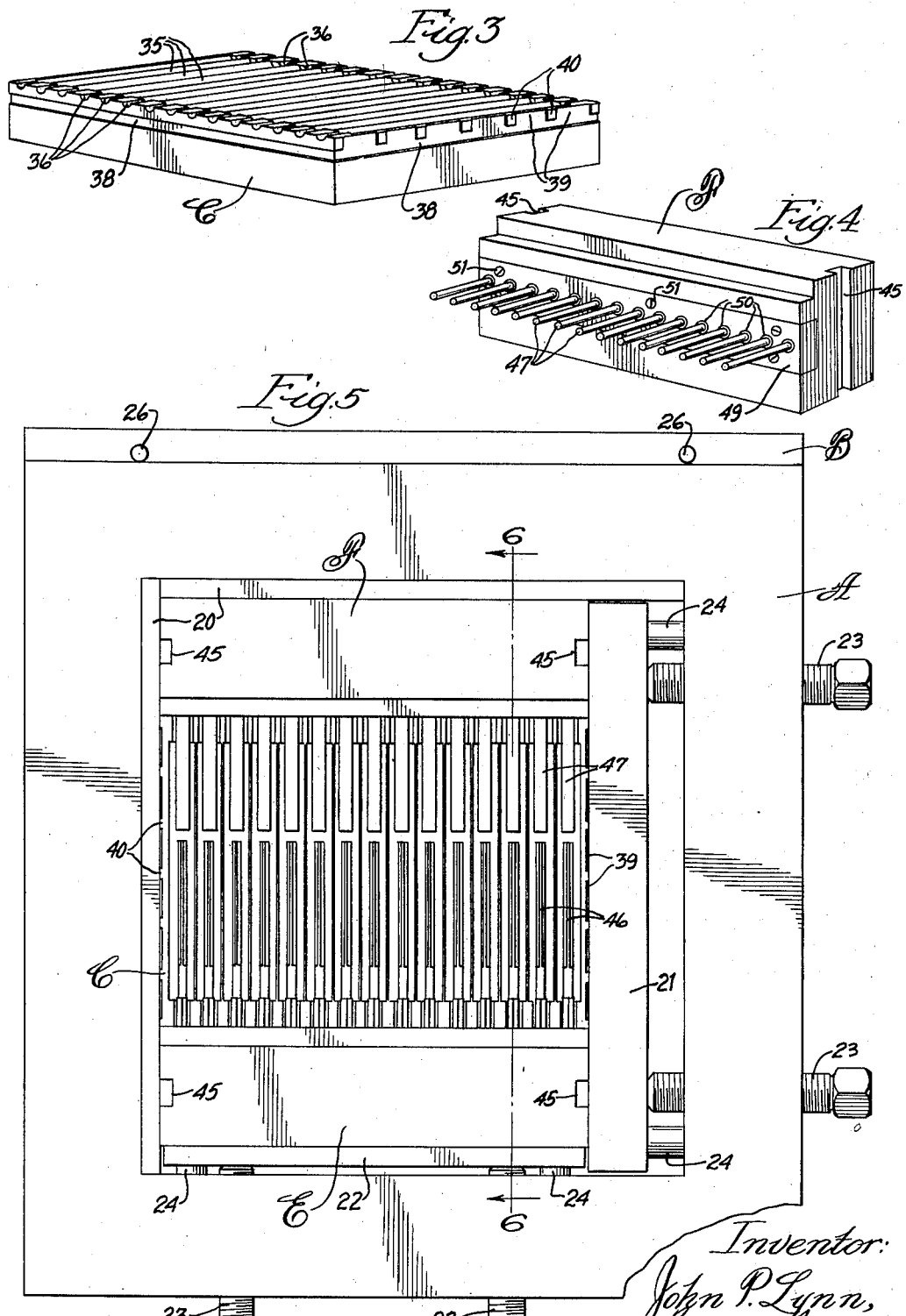

May 15, 1934.    J. P. LYNN    1,959,288
METHOD OF MAKING PENCIL BODIES
Filed July 11, 1931    5 Sheets-Sheet 3

Inventor:
John P. Lynn,
By Banning & Banning
Attys.

May 15, 1934.  J. P. LYNN  1,959,288
METHOD OF MAKING PENCIL BODIES
Filed July 11, 1931   5 Sheets-Sheet 4
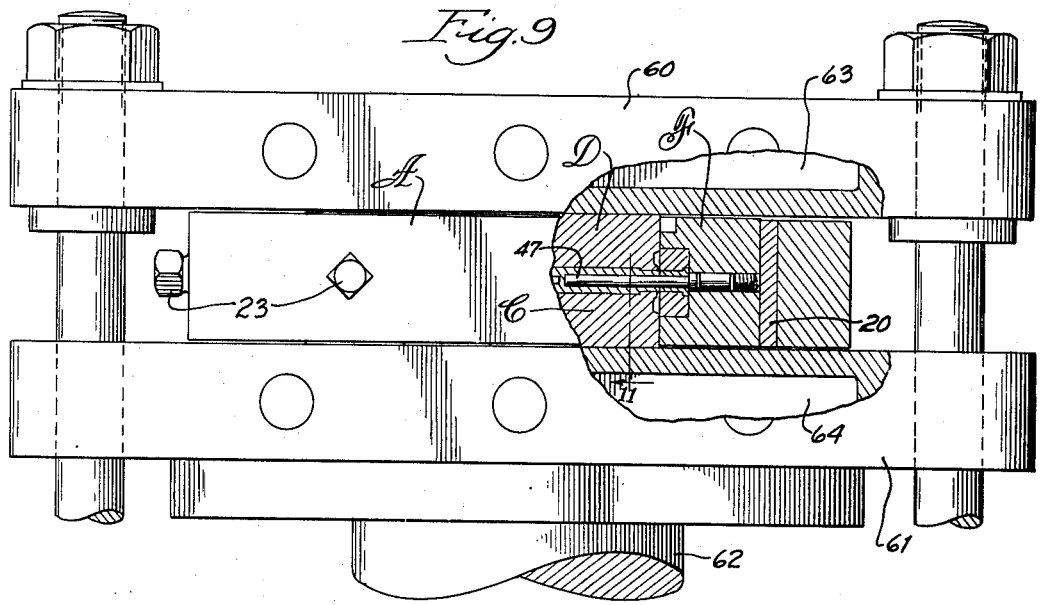
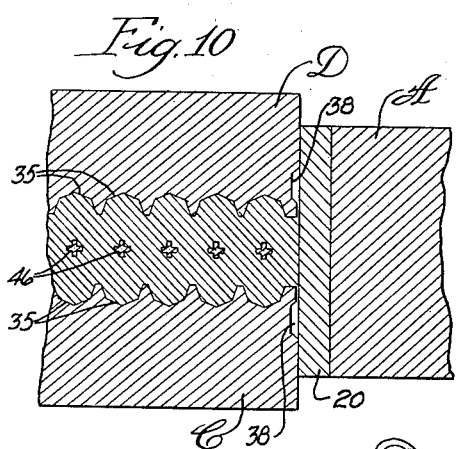
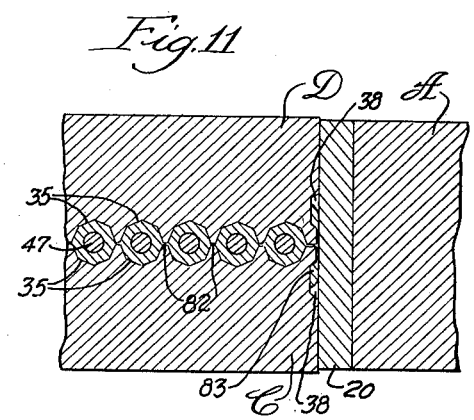
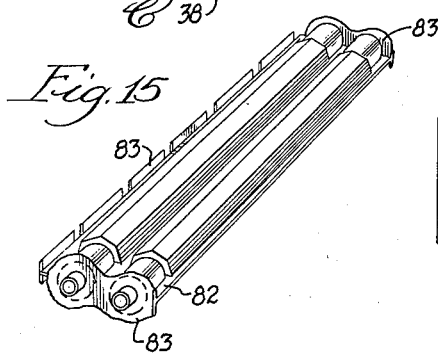
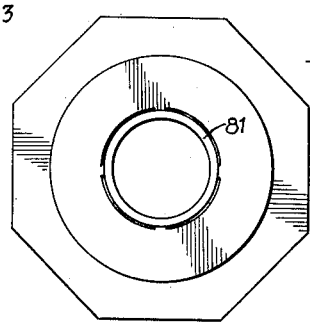
Inventor:
John P. Lynn,
By Manning & Manning
Attys.

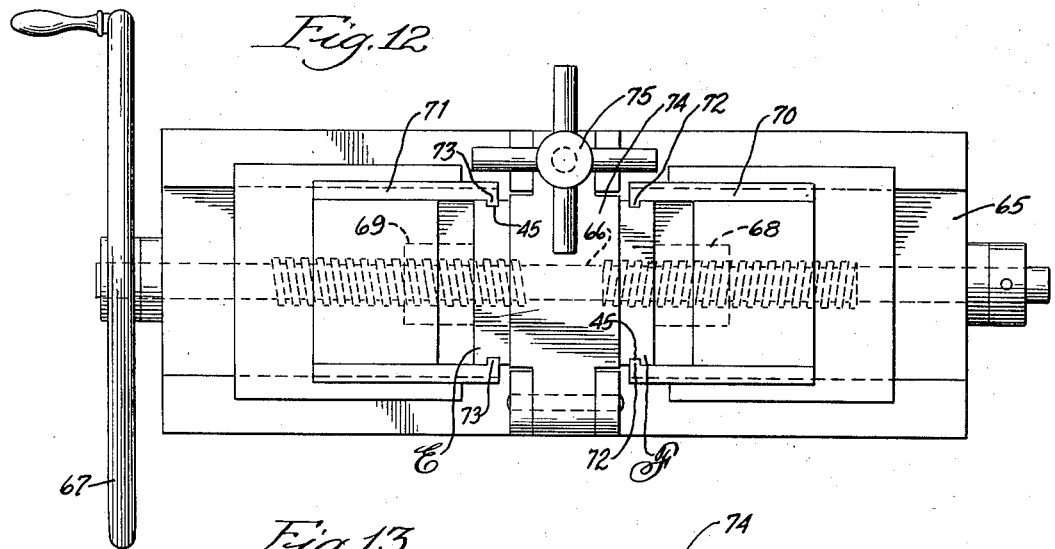
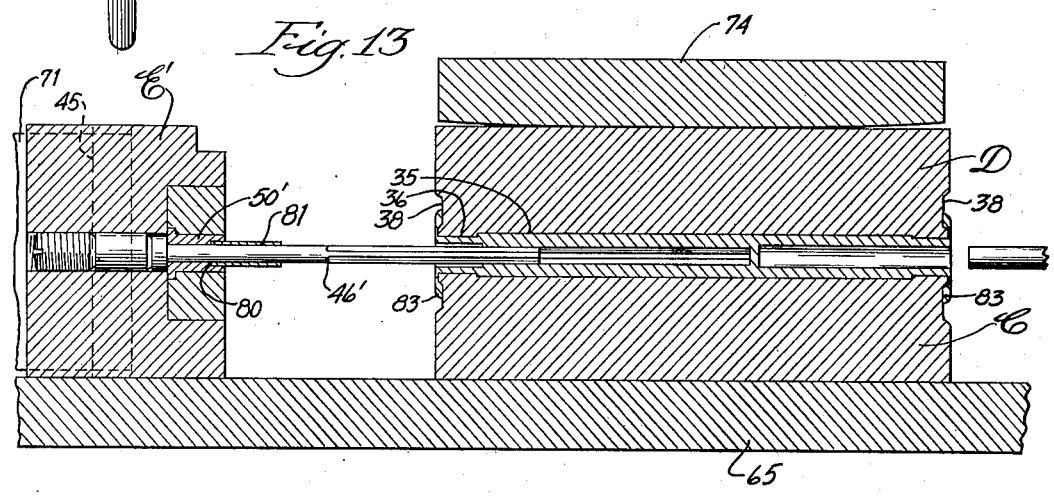
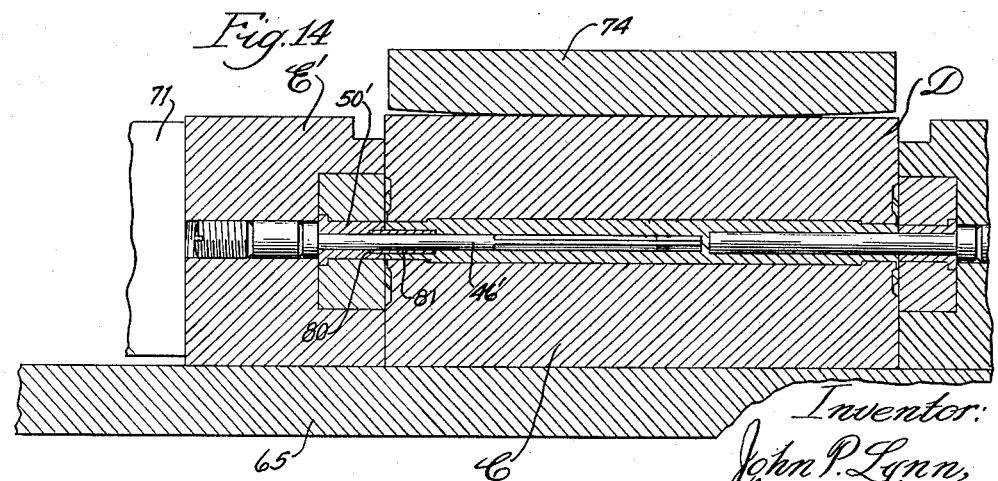

Patented May 15, 1934

1,959,288

UNITED STATES PATENT OFFICE 1,959,288

METHOD OF MAKING PENCIL BODIES

John P. Lynn, Chicago, Ill., assignor to Dur-O-Lite Pencil Company, Sycamore, Ill., a corporation of Delaware Application July 11, 1931, Serial No. 550,148

3 Claims. (Cl. 18—55)

This invention relates to a process of forming in one operation pencil bodies from a powdered or granular fusible material, such as a phenolic condensation product. In the past, it has been possible to form pencil bodies from such material, but in no less than two distinct operations, with resulting extra expense. The problems attending the manufacture of such an article as a pencil body are due in large part to its special form, both interiorly and exteriorly. Such difficulties I have obviated without modification of the article to be produced and solely by utilizing means, steps, and the principle heretofore unknown in the moulding operation hereinafter described.

In explanation of my improved method, reference may be had to the accompanying drawings, in which—

Figure 1 is a plan view of a frame in which the several parts of the mould are to be assembled;

Fig. 2 is a plan view of a face plate used in assembling the mould in the frame;

Fig. 3 is a perspective view of one of the dies;

Fig. 4 is a perspective view of an end block and the mandrels carried thereby;

Fig. 5 is a plan view of the frame with the lower die and the end blocks assembled in place;

Fig. 9 is a fragmentary view of a hydraulic press having a portion broken away to show the dies forced to the final position and the pencil body formed therebetween;

Fig. 10 is a partial enlarged sectional view through the dies before being compressed, taken on line 10 of Fig. 8;

Figure 6:
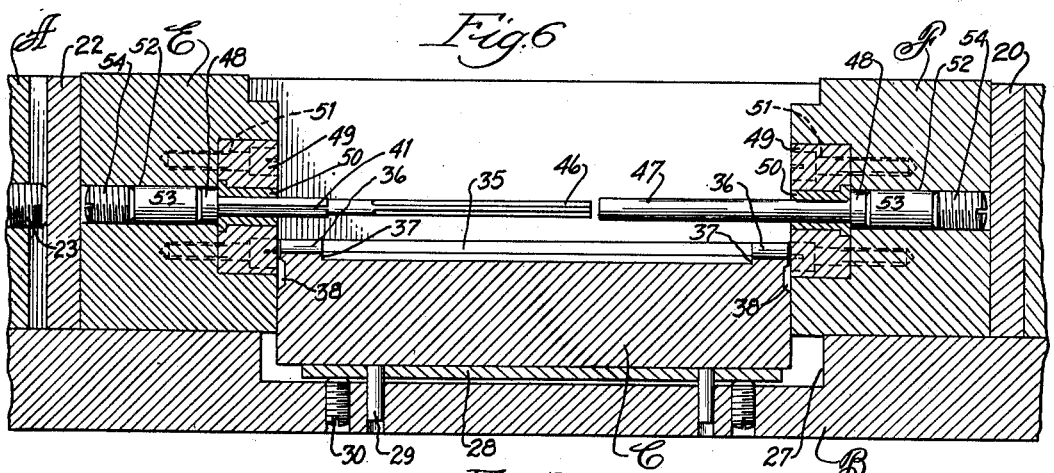
Fig. 6 is an enlarged fragmentary sectional view taken on the line 6—6 of Fig. 5.
Figure 7:
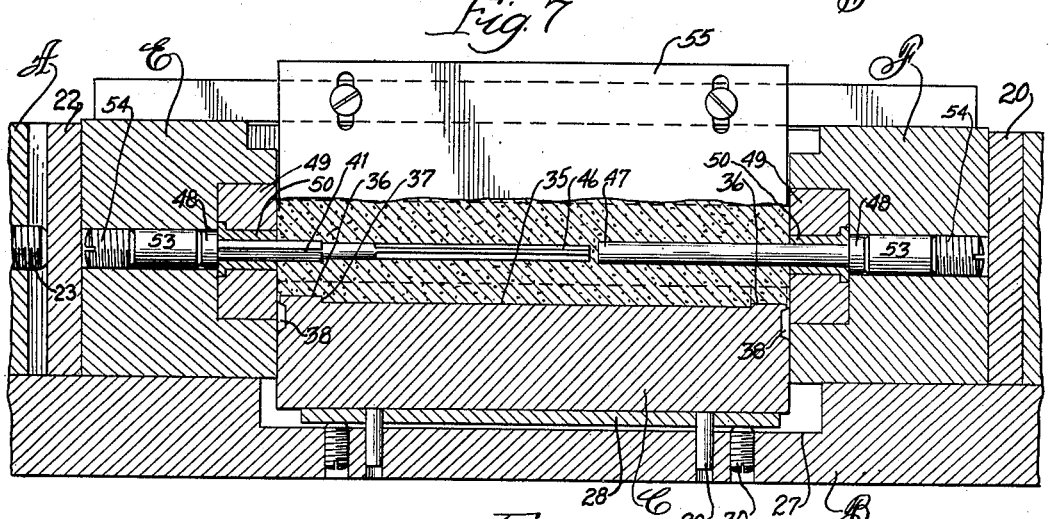
Fig. 7 is a view similar to Fig. 6 with the powdered phenolic condensation product in the mould.

Fig. 11 which is a view similar to Fig. 10 shows the dies after compression, taken on the line 11 of Fig. 9;

Fig. 12 is a plan view of the stripping machine for removing the mandrels from the moulded pencil body;

Fig. 13 which is an enlarged vertical sectional view of the dies held in the stripping machine, shows an end block with bushings fitted over projecting pins ready for insertion in the pencil body;

Fig. 14 which is a view similar to Fig. 13 shows the end block forced to position against the dies;

Fig. 15 is a perspective view of two pencil bodies after removal from one end of the mould, connected by a very thin web; and Fig. 16 is a greatly enlarged and elevational view of a pencil showing a bushing placed therein.

The article to be produced, according to the present method, is of general cylindrical form, with a series of elongated flat faces desirably arranged around its periphery. It may also be characterized by the provision of an axial chamber which opens upon one or both ends of the body, and exteriorly by one or more circular end portions of reduced diameter which, at their juncture with the remaining portion of the body, form shoulders that make for added difficulties in a moulding operation. It is features such as these, in an implement body to be produced from some such material as a phenolic condensation product, by a single application of heat and pressure, that must be specially considered and taken care of in the method now to be explained.

The production of moulded articles of the kind contemplated may advantageously be carried out with some such apparatus as is shown in the drawings. Here is illustrated a frame A used for locking the several parts of the mould in place, and provided with two inner edges lined with hardened steel plates 20. Friction blocks 21 and 22 are arranged adjacent the other inner edges, adapted to be moved toward the center of the frame by adjusting screws 23. The friction blocks may suitably be attached to the frame by means of guide pins 24 slidably fitted within the openings 25.

The face plate B, upon which the mould is assembled, is provided with stop pins 26 for aligning one edge of the frame, as shown in Fig. 5. The center portion of the face plate is preferably recessed to a lower level, as shown at 27, to receive an adjustable plate 28 mounted on guide pins 29 adapted to be raised or lowered by set screws 30. The purpose of this adjustable plate will presently be described.

The face plate may optionally be provided with screws 31, the heads of which may act as contact points for the frame A. When the screws 31 are raised to a desired height, they may be locked against movement by transverse screws 32 in a well-known manner. The upper and lower dies, C and D, respectively, are made alike, and, for simplicity of description, only one will be described in detail.

Referring to Fig. 3, the die consists of a steel block of suitable dimensions, and has cut in one face thereof parallel grooves 35 which may be semi-octagonal in cross section, as shown in Fig. 10. While I have shown fifteen such grooves, this number is entirely optional. At each end of the grooves 35 and in axial alignment therewith are formed semi-circular recesses 36 having such a radius as to leave a shoulder 37. Preferably, a recess 38 is cut around the die at a point below the grooves 35, and lateral recesses 39 extend to the grooved surface along the ends of the die, leaving projections 40 to insure rigidity of the die when under pressure, the recess 38 receiving any excess of flowing material during the moulding process.

End blocks E and F of the same length as the dies are placed in the frame to be clamped therein simultaneously with the dies. The end blocks have grooves 45 in their ends to assist in removing the blocks after the moulding process has been completed. The end blocks E and F are provided with mandrels 46 and 47, respectively, each mandrel being provided with a head 48. The mandrels 46 are cruciform in cross section (see Fig. 10) to provide slots within the moulded pencil body for engagement with the flattened end of a lead propeller, as is common with mechanical pencils. Adjacent their bases these mandrels are longitudinally ribbed, as at 41, to mould a four-point bearing in the pencil body for supporting the bushing, as shown in Fig. 16. The mandrels 47 are shown as cylindrical in cross section to form a spare lead chamber in the other end of the pencil body.

To facilitate the replacement of mandrels, which sometimes are broken, the end blocks are each recessed to receive a base 49 having bushings 50 in aligned relation with grooves 35 in the dies. The mandrels are assembled in the bushings whereupon the base 49 is secured by means of screws 51 to the end block. Threaded openings 52 in alignment with the mandrels receive blocks 53 and set screws 54 for securing the mandrels in the base 49.

Figure 8:
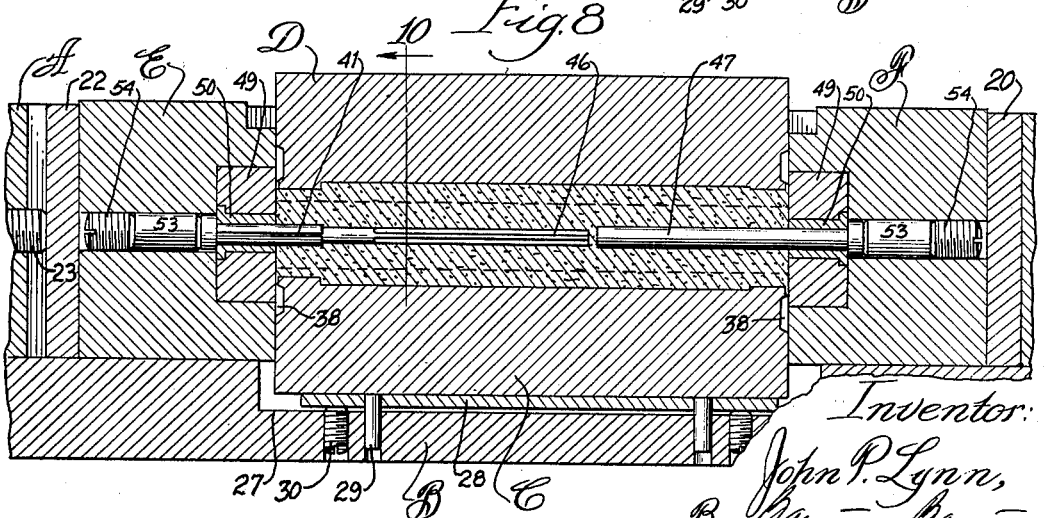
Fig. 8 is a view similar to Fig. 7 showing the upper die placed in position in the mould.

In practicing the method of this invention, the mould is first assembled, as shown in Fig. 6, following which a predetermined quantity of the fusible powder, preferably a phenolic condensation product, is placed in the mould and spread around by a gauge 55 so as to fill every portion of the space between the end blocks. The upper die D is next set in place over and upon the material, as shown in Figs. 8 and 10, with its grooves complementary to those in the die C. It is important that the die C be adjusted to the proper position below the frame so that, in conjunction with the quantity of fusible material introduced into the mould, the upper die D will be spaced from the mandrels equally with the lower die. In practice, the adjustable plate is set for a run of pencils of a certain color or grade of material, and when a new and different run is started, the adjustable plate is set accordingly. It is for this reason that the face plate is desirably provided with an adjustable plate 28 upon which the lower die may be placed.

After the upper die is placed in the mould, the screws 23 are tightened to clamp the end blocks and dies in place, the entire mould is then lifted from face plate and placed in a press between heated heads 60 and 61, whereupon the hydraulic piston 62, with a force of perhaps 75 tons, advances the one head toward the other to press the dies together. This pressure, along with the heat from the heads, is sufficient to completely fuse the powdered material, thereby moulding a series of pencil bodies to the form indicated in Fig. 15. It will be seen that each body is produced, in one operation, to a final and complete form. The heat required for the moulding operations may be applied by electrical heating units, or by steam conducted through suitable pipes to the chambers 63 and 64 in the heads. After a suitable time interval, depending upon the material used, the pressure is relieved, the mould removed, and the screws 23 loosened to permit removal from the frame of the dies and blocks as a unit for subsequent disassembly in a stripping machine, as shown in Fig. 12, wherein, optionally, a second operation may be performed, as will shortly be explained.

The stripping machine comprises a base 65 within which a screw 66 is mounted, the screw being provided with right and left-hand threads, and operable by a hand wheel 67. The screw engages the blocks 68 and 69 to which are affixed slides 70 and 71 having hooks 72 and 73 for engagement with the grooves 45. The dies are held by a clamp arm 74 pivotally connected to the base, its free end being held down by a screw clamp 75. The face of the clamp arm which contacts with the upper die may be slightly rounded so that the clamping force is exerted on the center of the die. When the hand wheel is turned, the screw moves the slides which engage the grooves in the end blocks to withdraw the mandrels from the pencil bodies.

The dies remain clamped in the stripping machine while the end blocks are removed, and an end block E' of modified construction is placed in engagement with the hooks 73. The end block E' has mandrels 46' corresponding in number and position to mandrels 46, but differing in the respect that the ribs 41 are lacking. The opening in the bushings 50' are enlarged at their upper ends to provide shoulders 80 for the ends of tubular bushings (see Fig. 13) and to receive a portion of the bushing intended to project beyond the pencil end after assembling (see Fig. 14). The bushings 81 form, in each instance, a bearing for a pencil tip, as shown in my application Serial No. 493,502, filed November 5, 1930, and it is preferred to force these bushings into the ends of the pencil bodies before they have cooled and become set. It will be seen that the mandrels on the end block E' may have the bushings 81 placed thereon while the mould is in the press, and as soon as the end block E is removed the block E' may be immediately set in place and forced to the position shown in Fig. 14 by turning the hand-wheel. The block E' is then removed, the clamping arm released, and the dies separated whereupon the pencil bodies are withdrawn.

The pencil bodies produced complete in this manner are usually connected by a thin web 82 of about .001 of an inch in thickness which breaks with only the slightest force. There may also be attached some further excess material which has overflowed into the recess 38. This is indicated at 83 in Fig. 15. To remove such excess of material, which is of inconsequential amount, it is necessary only to rub the pencil bodies together in the hand, whereupon all of it drops off.

The operations, as hereinbefore described, require but a single application of heat and pressure for the complete production of a pencil body. This method of procedure is possible due to horizontal positioning of complementary dies for the finished product, the dies being movable toward each other between end blocks from which project mandrels or pins or both, the entire space between the dies being first filled with fusible material disposed equally on opposite sides of the mandrels, the fusible material acting to maintain the movable dies equidistant at all times from the intervening mandrels or pins. Also, as an optional additional step, this invention includes the forcible insertion of bushings in the bodies before they are released from between the forming dies and while they are still sufficiently hot to be somewhat plastic. The advantage of this is, if there be a slight decentering of the mandrels or pins relative to the opposed dies, with a consequent off-centering of the chambers formed in the bodies, this imperfection is fully corrected at the one important point, viz., the body ends where mountings are provided for the bushings, correction being accomplished automatically as the bushings are forced in to position with the surrounding body material still in a somewhat plastic condition. The excess material expressed through the overflow passages represents a negligible loss, and adheres in the form of fins or webs so thin and small as to break off completely with even the most ordinary handling.

I claim:

1. The method of forming pencil bodies comprising evenly distributing fusible powdered material on opposite sides of a mandrel placed over the inner face of a lower die, placing an upper die on the material whereby the mandrel is equidistantly disposed between the inner faces of the dies, applying to the mould sufficient heat and pressure to fuse the material around the mandrel to form a complete pencil body, withdrawing the mandrel from the mould while the fused material therein is still hot and plastic, and thereafter forcing into the opening left another mandrel carrying a part which remains inseparably affixed to the moulded product upon cooling thereof.

2. The method of forming pencil bodies which comprises assembling within a frame a bottom horizontal die and a block having mandrels extended horizontally from one side of the block to overlie the bottom die in spaced relation thereto, adjusting the position of the bottom die relative to the mandrels in accordance with the nature of the fusible material to be used, placing within the mould a quantity of fusible powdered material sufficient for distribution in equal amounts below and over the mandrels therein, assembling with the mould a top horizontal die which is rested upon the material contained within the mould, securing the parts in adjusted position within the frame, and applying in a single operation to both dies heat and pressure in amounts sufficient to force the material between the dies and around the mandrels to form complete pencil bodies, each having an end opening therein.

3. The method of forming pencil bodies with a single application of heat and pressure, comprising evenly distributing fusible powdered material on opposite sides of a mandrel placed above the inner face of a lower die, placing an upper die on the material whereby the mandrel is equidistantly disposed between the inner faces of the dies, frictionally securing the dies and mandrel in adjusted relationship in a frame by the lateral application of pressure uniformly applied from the frame to adjacent side portions of the dies through a block carrying the mandrel, and in applying to the outer faces of the dies heat and pressure in amounts sufficient to fuse and form the material into a substantially hollow body with a central chamber conforming to the size and contour of the mandrel.

JOHN P. LYNN.